(12) United States Patent
Hagedorn et al.

(10) Patent No.: US 10,619,661 B2
(45) Date of Patent: Apr. 14, 2020

(54) MOUNTING ASSEMBLY FOR A PICKUP TRUCK BOX

(71) Applicant: Ford Global Technologies, LLC, Dearborn, MI (US)

(72) Inventors: Gregory Hagedorn, Bloomfield Hills, MI (US); Pattrick Loew, Dearborn, MI (US); Johnathan Line, Northville, MI (US)

(73) Assignee: Ford Global Technnologies, LLC, Dearborn, MI (US)

( * ) Notice: Subject to any disclaimer, the term of this patent is extended or adjusted under 35 U.S.C. 154(b) by 104 days.

(21) Appl. No.: 15/871,570

(22) Filed: Jan. 15, 2018

(65) Prior Publication Data

US 2019/0219081 A1    Jul. 18, 2019

(51) Int. Cl.
| | | |
|---|---|---|
| F16B 5/00 | (2006.01) | |
| B60P 7/08 | (2006.01) | |
| F16B 5/02 | (2006.01) | |
| F16B 5/06 | (2006.01) | |
| B60R 11/00 | (2006.01) | |
| B60R 13/01 | (2006.01) | |

(52) U.S. Cl.
CPC .............. *F16B 5/0024* (2013.01); *B60P 7/08* (2013.01); *B60R 11/00* (2013.01); *B60R 13/013* (2013.01); *F16B 5/0208* (2013.01); *F16B 5/0628* (2013.01); *B60R 2011/004* (2013.01); *B60R 2011/0052* (2013.01); *F16B 2005/0678* (2013.01)

(58) Field of Classification Search
CPC ..... B60P 7/0807; B60P 7/0815; B60P 7/0823; B60P 1/286; B60P 3/07; B60P 3/122; B60P 7/15; B60P 1/00; B60R 7/02; B60R 22/18; B60R 5/041; B60R 7/08; B60R 7/10; B60R 9/045; F16B 45/00; F16B 13/0808; F16B 37/045; F16B 37/14
USPC ..... 410/106, 104, 116, 112, 97, 102, 94, 39, 410/32, 2, 155, 143; 296/186.1, 43, 41, 296/40, 191, 100.02, 204; 248/131, 137, 248/138, 156, 166, 172, 167
See application file for complete search history.

(56) References Cited

U.S. PATENT DOCUMENTS

| | | | | |
|---|---|---|---|---|
| 2,660,130 | A * | 11/1953 | Johnson | B61D 45/001 24/115 R |
| 6,481,604 | B1 | 11/2002 | Beene et al. | |
| 6,799,927 | B2 * | 10/2004 | Wheatley | B61D 45/001 410/104 |
| 7,731,026 | B2 * | 6/2010 | Harrison | B60P 3/14 206/349 |
| 7,815,405 | B2 * | 10/2010 | Aftanas | B60P 7/15 410/104 |

(Continued)

*Primary Examiner* — D Glenn Dayoan
*Assistant Examiner* — Sunsurraye Westbrook
(74) *Attorney, Agent, or Firm* — David Coppiellie; Brooks Kushman P.C.

(57) ABSTRACT

A vehicle includes a truck bed having a sidewall extending upward from a floor panel, and an anchor plate secured to an internal surface of the sidewall. The vehicle further includes a mounting assembly removably secured to the anchor plate. The mounting assembly includes a planar plate defining an array of holes, and an attachment member secured to the plate. The attachment member defines a T-mount for engaging the anchor plate and a handle defining a cavity.

18 Claims, 5 Drawing Sheets

(56) References Cited

U.S. PATENT DOCUMENTS

| | | | | |
|---|---|---|---|---|
| 8,505,794 | B2* | 8/2013 | Ardigo | B60R 7/08 |
| | | | | 224/543 |
| 9,664,481 | B2* | 5/2017 | Alcantra | A41D 3/00 |
| 9,834,151 | B2* | 12/2017 | Henry | B60R 9/048 |
| 2009/0014602 | A1 | 1/2009 | Frost | |
| 2011/0259772 | A1* | 10/2011 | Forsyth | B29C 65/561 |
| | | | | 206/320 |
| 2013/0193179 | A1 | 8/2013 | Davidson | |
| 2015/0189977 | A1* | 7/2015 | Thompson | A45F 5/02 |
| | | | | 24/3.7 |
| 2016/0264026 | A1 | 9/2016 | Michalak et al. | |
| 2017/0113596 | A1 | 4/2017 | Graves et al. | |

* cited by examiner

MOUNTING ASSEMBLY FOR A PICKUP TRUCK BOX

TECHNICAL FIELD

This disclosure relates to a pickup truck box and a universal attachment system for a pickup truck box having an accessory interface system.

BACKGROUND

Pickup trucks include cargo beds that are configured to received and store cargo being transported. Using existing structural features to secure objects to a pickup truck box may not meet all of a user's needs and requirements. Some users may drill holes in the pickup truck box to provide interface points for accessories. Drilling holes in a pickup truck box may increase the extent of corrosion, disrupt the integrity, and reduce the strength of the structure.

SUMMARY

In at least one approach, a vehicle is provided. The vehicle may include a pickup-truck box including a bed and opposing sidewalls extending vertically from the bed. The vehicle may further include an anchor plate supported on at least one of the sidewalls of the pickup-truck box and defining an opening through the anchor plate. The anchor plate and the at least one side sidewall may further define a cavity between the anchor plate and the at least one sidewall. The vehicle may further include a mounting assembly removably secured to the anchor plate. The mounting assembly may include a planar plate extending substantially parallel to the at least one sidewall and that may define an array of apertures including at least one column of elongated apertures and a mounting aperture. The mounting assembly may further include an attachment member disposed in engagement with the anchor plate. The attachment member may include a T-mount having a neck region extending substantially perpendicularly from a back surface of the planar plate proximate the mounting aperture and through the opening. The T-mount may further include a head region disposed at least partially in the cavity. The head region may include at least one flange extending from the neck region parallel to the planar plate.

In at least one approach, a mounting assembly for a sidewall of a truck bed is provided. The mounting assembly may include a planar plate removably securable to the sidewall. The planar plate may define an array of apertures including a plurality of spaced apart elongated aperture columns and at least one threaded circular aperture. The mounting assembly may further include a spacer assembly including a threaded bolt axially movable within the threaded circular aperture. The spacer assembly may further include an elastomeric tip disposed at an end of the threaded bolt for engaging the sidewall.

In at least one approach, a mounting assembly for a sidewall of a truck bed is provided. The mounting assembly may include a planar plate removably securable to the sidewall. The planar plate may include an array of apertures including alternating columns of elongated aperture columns and circular aperture columns. The mounting assembly may include at least one elastomeric insert disposed at least partially through an aperture of the array of apertures. The elastomeric insert may extend beyond a back surface of the planar plate.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
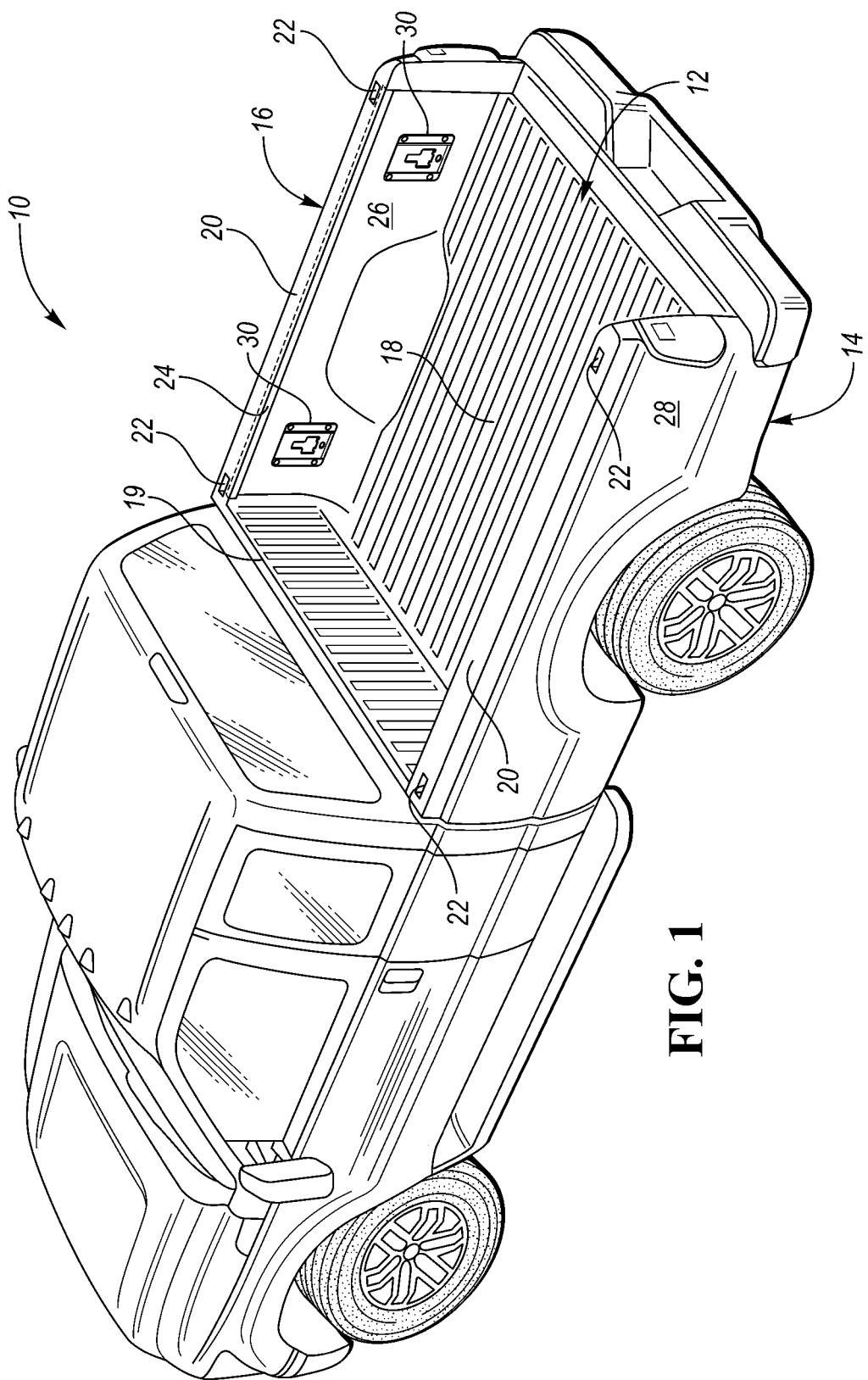
FIG. 1 is a perspective view of a vehicle having a cargo or truck bed.

Referring to FIG. 1, a vehicle 10 is illustrated. The vehicle 10 may be a truck that includes a cargo or truck bed 12. The truck bed 12 may include opposing sidewalls, such as a first sidewall 14 and a second sidewall 16. The first sidewall 14 and second sidewall 16 may extend vertically from a truck bed floor 18 (which may also be referred to as a cargo bed floor or floor panel). For purposes of description herein, the terms "vertical," "horiztonal," "upper," "lower," "left," "right," "inner," "outer," "side," and "top," and derivatives thereof shall relate to the vehicle as oriented in FIG. 1.

The truck bed 12 may also include a headboard panel 19, and a tailgate (not shown). The first sidewall 14 and second sidewall 16 may extend upward from the truck bed floor 18. The components of the truck bed 12, including the first sidewall 14, second sidewall 16, floor 18, headboard panel 19, and tailgate, may be made from a sheet metal material, including but not limited to, steel sheet or an aluminum alloy sheet. The first sidewall 14 and second sidewall 16 may have top surfaces 20 that define stake pockets 22. The stake pockets 22 may be through holes that extend through the top surfaces 20. Portions of the first sidewall 14 and second sidewall 16 (which may be referred as overhangs 24) may extend away and then downward from the top surfaces 20 of the first and second sidewalls, towards the truck bed floor 18.

The first and second sidewalls 14, 16 may include internal side surfaces 26 that face towards the interior of the truck bed 12 and external side surfaces 28 that face towards the exterior of the truck bed 12. The internal side surfaces 26 of the first sidewall 14 and second sidewall 16 may be referred to as opposing internal surfaces of the first sidewall 14 and second sidewall 16.

It may be desirable to secure accessories at different locations within the cargo bed 12. A plurality of anchors 30 may be affixed at various locations of the truck bed 12 to provide a number of different securing points for various accessories. In at least one approach, anchors 30 may be provided at several locations on one or more of the truck bed floor panel 18, first sidewall 14, second sidewall 16, headboard panel 19, and tailgate. In the depicted approach, two anchors 30 may be disposed at the internal side surface 26 of the first sidewall 14 between the top surface 20 of the first sidewall 14 and the truck bed floor 18. The depicted approach may also include two additional anchors 30 at the internal side surface 26 of the second sidewall 16 between the top surface 20 of the second sidewall 16 and the truck bed floor 18. In still other approaches, an anchor 30 may be an elongate track having a number of different secure points along its length.

Figure 2:
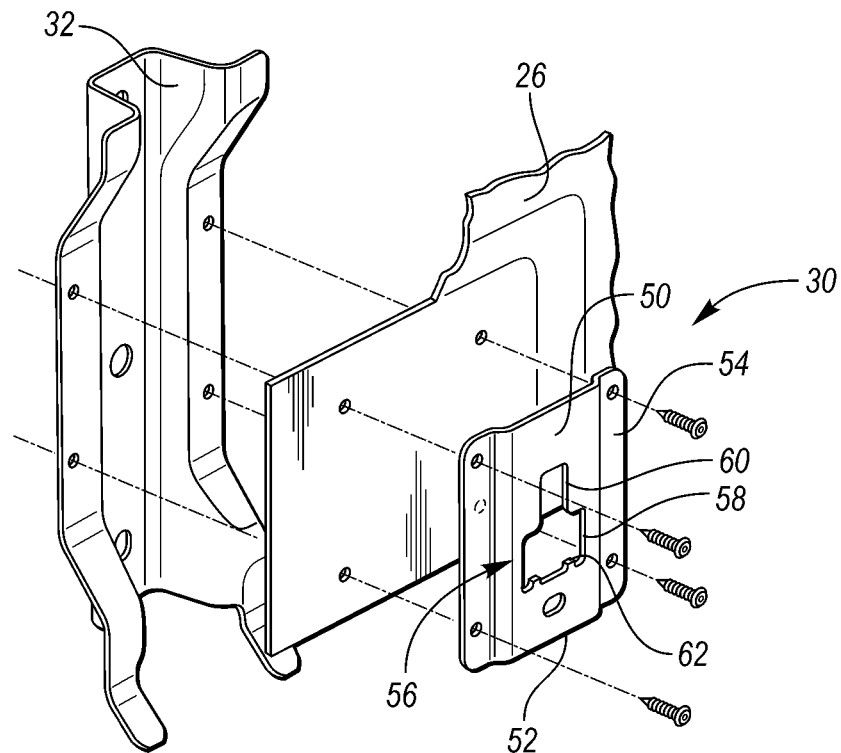
FIG. 2 is a perspective view of an anchor.

Referring to FIG. 2, the anchors 30 may include an anchor plate 50 that is mounted to a corresponding one of the sidewalls 14, 16. The anchor plate 50 may alternatively be referred to as a docking plate. The anchor plate 50 may include a pair of opposing mounting flanges 54. The anchor plate 50 may be located adjacent to a reinforcing structure 32 so that the flanges 54 of the anchor plate 50 may be secured to the internal side surface 26 and the reinforcement structure 32 with one or more fasteners.

An offset section 52 may be provided between, and may interconnect, the opposing mounting flanges 54. The offset section 52 may also be referred to as the protruding middle section. The offset section 52 may be positioned at a distance away from the internal side surface 26 to provide a gap or cavity. More specifically, the cavity may be defined by the offset section 52 of the anchor plate 50 spatially between the offset section 52 and the internal side surface 26 of the respective sidewall that the anchor 30 is attached to, whether it be the first sidewall 14 or the second sidewall 16.

In at least one approach, an opening 56 (or keyway) may be provided through the anchor plate 50; for example, near a center portion of the offset section 52. The opening 56 may include an insertion portion 58 and a locking portion 60 that may be above the insertion portion 58. The insertion portion 58 may be wider than the locking portion 60. The opening 56 may further include one or more retention tabs 62 disposed, for example, at a bottom periphery of the insertion portion 58. The opening 56 may access the gap defined by the offset section 52.

The opening 56 may be shaped to receive a locking feature from an interfacing component to retain to the anchor 30. In this way, a number of different devices can be mechanically retained to the offset section 52 by extending into the gap and engaging a back surface of the offset section 52. For example, and as discussed in greater detail elsewhere herein, the opening 56 may be shaped and sized to receive and retain a cleat. The opening 56 and the cleat may be designed so that the cleat can be inserted into and out of the insertion portion 58 but release of the cleat from the locking portion 60 may be inhibited due to the locking portion 60 being narrower than a width of the cleat. In other examples, an interfacing component may be secured to an upper edge and/or a lower edge of the anchor plate 50, as well as (or instead) to an auxiliary hole disposed through the anchor plate 50 (e.g., an auxiliary plate disposed the offset section 52).

Figure 3:
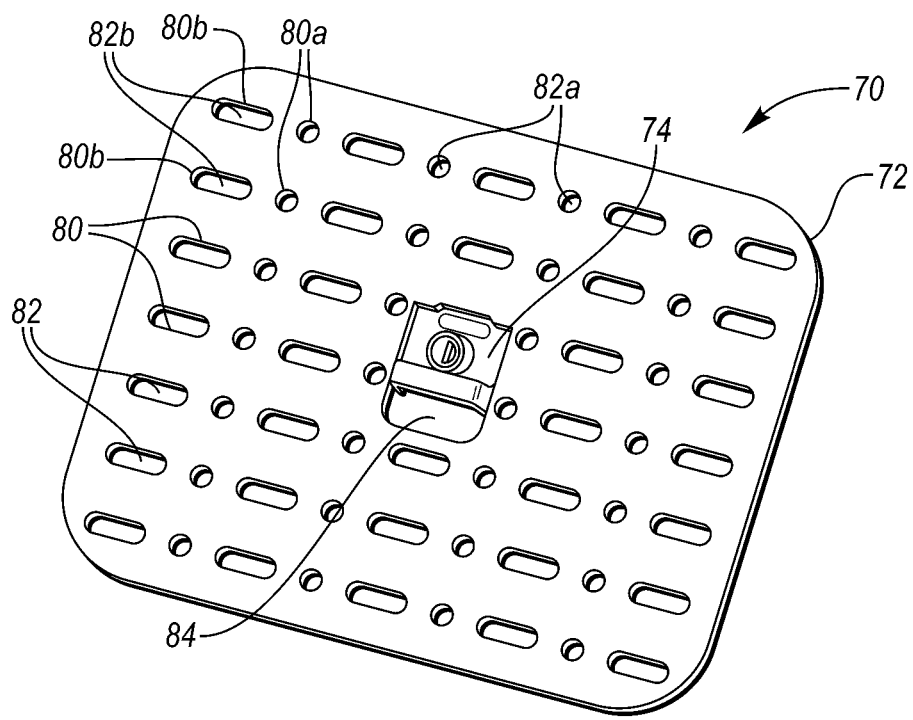
FIG. 3 is a perspective front view of a mounting assembly.

Referring to FIG. 3, a mounting assembly 70 is illustrated. The mounting assembly 70 may include a plate member 72 and an attachment member 74. The plate member 72 may be a substantially planar structure. The plate member 72 may define a substantially rectangular or square structure, and may be provided with rounded corners. The plate member 72 may be formed of stainless steel, or any other suitable material (or combinations of material), including aluminum, aluminum alloy, carbon steel, alloy steel, magnesium, magnesium alloy, titanium, titanium alloy, and metalized carbonfiber.

A plurality of aperture walls 80 may extend through the plate member 72 to define apertures 82. More particularly, the aperture walls 80 may extend through an entire thickness of the plate member 72 such that the apertures 82 are through holes in the plate member 72. The apertures 82 may be disposed in an array. In at least one approach, the aperture walls 80 may define apertures 82 having at least two distinct shapes. For example, a first set of aperture walls 80a may define circular apertures through the plate member 72. The circular apertures may have radii, for example, of approximately 6 millimeters. A second set of aperture walls 80b may define elongated apertures (e.g., oval or ellipse) through the plate member 72. As used herein, an elongated aperture is an aperture having a dimension along one axis in a plane that is longer than a dimension in an orthogonal axis extending in the same plane. For the example, an elongated aperture may have a planar length greater than a planar height. The elongated apertures may have, for example, a length of at least approximately 25 millimeters (and preferably approximately 47 millimeters) and a height of 12 millimeters. Alternatively, an elongated aperture may have a height greater than a length.

The first and second sets of apertures wall 80a, 80b may be disposed in alternating columns or rows. For example, a column of circular apertures may be disposed between first and second columns of elongated apertures. The plate member 72 may be provided with at least four columns of elongated apertures and at least three columns of circular apertures disposed in alternating disposed arrangement with the at least four columns of elongated apertures along the planar plate. The columns of elongated apertures may include at least three elongated apertures, and the columns of circular apertures may include at least three elongated apertures. In at least one approach, the columns of circular apertures may include the same number of circular apertures as elongated apertures of the elongated aperture columns. As shown in FIG. 3, circular apertures of the column of circular apertures may be vertically aligned with elongated apertures of the first and second columns of elongated apertures.

In at least one approach, the plate member 72 may further be provided with one or more interface apertures 84 that may be adapted, for example, to receive a portion of the attachment member 74. The interface aperture 84 may be dimensioned such that it is larger than apertures of the first set of apertures 82a and the second set of apertures 82b.

The apertures 82 may be sized to receive attachment devices from various objects. For example, the apertures 82a formed by the first set of aperture walls 80a may receive hooks, clips or fasteners that may be part of tie down systems. The apertures 82b formed by the second set of aperture walls 80b may receive straps therethrough. In at least one approach, the second set of apertures 82b may be receive the straps of backpacks or Modular Lightweight Load-carrying Equipment (MOLLE) gear. In this way, the mounting assembly 70 may be referred to as a MOLLE panel. MOLLE gear may refer to load-bearing equipment, such as vests, belts, or backpacks, that may be used, for example, by military units, police departments, and fire departments. MOLLE gear may have webbing on one or more sides of the equipment.

Figure 4:
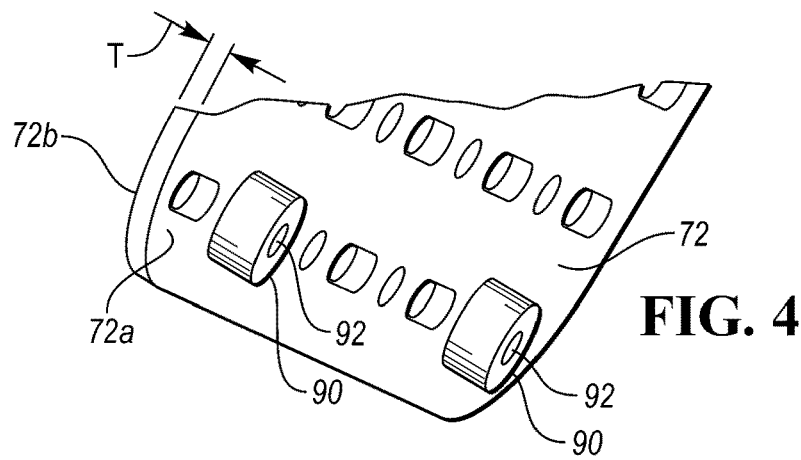
FIG. 4 is a perspective rear view of a portion of the mounting assembly.

Referring to FIG. 4, the plate member 72 may further be provided with one or more inserts 90. The inserts 90 may be formed of a material having a higher coefficient of friction than the plate member 72. The inserts 90 may have a durometer of 50, Shore A, 60 Shore A, 70 Shore A, 80 Shore A, or greater (i.e., harder). The inserts 90 may be, for example, elastomeric inserts formed of santoprene, ethylene propylene diene monomer rubber (EPDM), or silicone.

Figure 5:
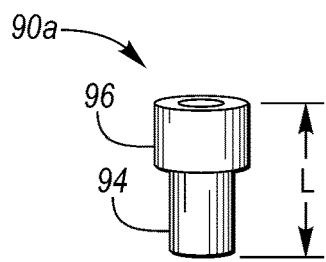
FIG. 5 is a perspective view of an example insert.
Figure 6:
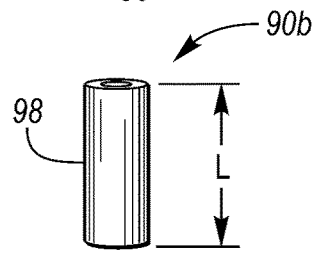
FIG. 6 is a perspective view of another example insert.

Referring momentarily to FIGS. 5 and 6, the inserts may take various forms. In at least one approach, the inserts may be circular elastomeric inserts that may be disposed at least partially through a circular aperture 82*a*. In the approach shown in FIG. 5, the inserts 90*a* may be have a neck portion 94 having a first outer diameter (e.g., approximately 12 millimeters), and a head portion 96 having a second outer diameter that may be larger than the first outer diameter (e.g., approximately 16 millimeters). In this way, the neck portion 94 may have an outer diameter substantially corresponding to (e.g., slightly less than, equal to, or slightly greater than) a diameter of an aperture 82 disposed through the plate member 72 (e.g., aperture 82*a*). Furthermore, the head portion 96 may have a larger outer diameter than a diameter of an aperture 82 disposed through the plate member 72 (e.g., aperture 82*a*). In the approach shown in FIG. 6, the inserts 90*b* may have a consistent diameter along a body portion 98 of the inserts 98*b*. The body portion 98 may have an outer diameter substantially corresponding to (e.g., slightly less than, equal to, or slightly greater than) a diameter of an aperture 82 disposed through the plate member 72 (e.g., aperture 82*a*).

In still another approach, the elastomeric insert may be elongated elastomeric inserts that may be disposed at least partially through an elongated aperture 82*b*. As used herein, an elongated insert is an insert having a dimension along one axis in a plane that is longer than a dimension in an orthogonal axis extending in the same plane. For the example, an elongated insert may have a planar length greater than a planar height. The elongated insert may have, for example, a length of at least approximately 25 millimeters (and preferably approximately 47 millimeters) and a height of 12 millimeters. Alternatively, an elongated insert may have a height greater than a length.

Individual inserts 90 may be provided with an inner aperture 92 disposed through at least a portion of the inserts 90. In at least one approach, the inner apertures 92 extend through an entire length of the inserts 90. In at least another approach, the inner apertures 92 extend through less than the entire length of the inserts 90.

In at least one approach, the inserts 90 may be disposed within one or more apertures 82 of the plate member 72, such as an aperture of the first set of apertures 82*a*. The inner apertures 92 disposed through the inserts 90 may facilitate installation of the inserts 90 within the apertures 82 of the plate member 72. For example, a user desiring to install an insert 90 within an aperture 82 of the plate member 72 may squeeze the insert 90, causing the insert 90 to collapse into the inner aperture 92, thereby reducing the outer diameter of the insert 90 at at least one location along an axis of the insert 90. The user may then install the insert 90 within an aperture 82. Releasing of the insert 90 may cause the insert 90 to expand (for example, to its original outer diameter), thereby causing the insert 90 to engage the aperture walls 80 and securing the insert 90 within the aperture 82.

Various quantities of inserts 90 may be installed in a plate member 72. In at least one approach, two inserts 90 may be installed, for example, in the region of the lower corners of the plate member 72. In at least another approach, four inserts 90 may be installed in the region of lower and upper corners of the plate member 72.

The inserts 90 may have an axial length L greater than a thickness T of the plate member 72. For example, the thickness T of the plate member 72 may be in the range of approximately 5 millimeters to approximately 10 millimeters, and the axial length L of the inserts 90 may be in the range of approximately 10 millimeters to approximately 40 millimeters. The ratio of axial length L of the inserts 90 to thickness T of the plate member 72 may be approximately 5:4, approximately 4:3, approximately 3:2, approximately 5:3, approximately 2:1, approximately 5:2, approximately 3:1, approximately 4:1, approximately 5:1, etc.

In this way, when installed, the inserts 90 may protrude beyond at least a back face 72*a* of the plate member 72. The inserts 90 may also protrude beyond a front face 72*b* of the plate member 72. When the mounting assembly 70 is secured to a vehicle 10, as discussed in greater detail elsewhere herein, the portion of the inserts 90 protruding beyond the back face 72*a* of the plate member 72 may engage an internal side surface 26 of a sidewall (e.g., sidewall 14, 16) of the vehicle 10. The engagement of the inserts 90 with internal side surface 26 may reduce or inhibit direct contact of the plate member 72 with the internal side surface 26. In this way, wear on the plate member 72 and/or the internal side surface 26 may be reduced. The engagement of the inserts 90 with internal side surface 26 may also provide additional stability to the mounting member 70. For example, movement (e.g., pivotal or tilt movement) of the plate member 72 relative to the internal side surface 26 may be reduced or inhibited.

Figure 7:
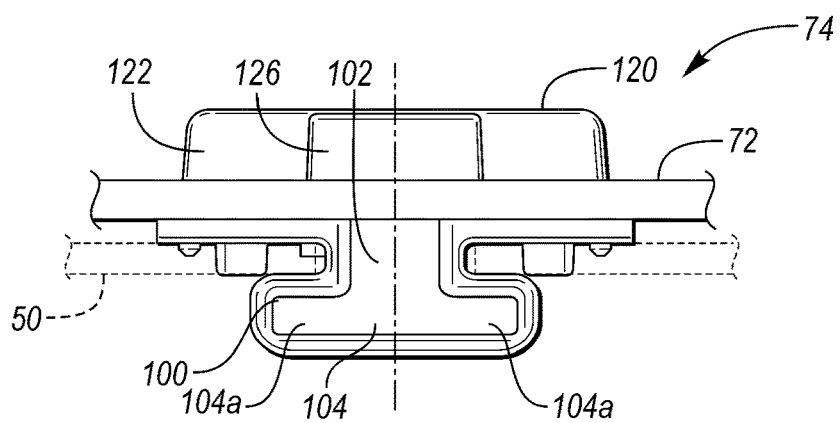
FIG. 7 is a top view of an attachment member of the mounting assembly.

Referring to FIG. 7, the mounting assembly 70 may further include one or more features, such as the attachment member 74, that may be used to connect with the anchors 30. In at least one approach, the attachment member 74 may be substantially permanently affixed to the plate member 72. For example, the attachment member 74 may be welded to the plate member 72. In still another approach, the attachment member 74 may be removably affixed to the plate member 72. For example, the attachment member 74 may be affixed to the plate member 72 through one or more removable fasteners.

The attachment member 74 may include a T-mount 100. The T-mount 100 may be a metal such as steel, or other suitable material. The T-mount 100 may be substantially permanently affixed to the plate member 72; for example, by welding or fastening the T-mount 100 to the plate member 72. The T-mount 100 may include a neck 102 (also referred to as a neck region) extending from a rear surface of the plate member 72, and a head 104 (also referred to as a head region) connected to a distal end of the neck 102. The neck 102 and the head 104 may be arranged to form a substantially T-shaped cross-section when viewed from above the attachment member 74. More particularly, the head region may include at least one flange 104*a* extending from the neck 102 parallel to the plate member 72. The neck 102 and head 104 may be integrally formed such that the T-mount 100 is a unitary T-mount, or may be separately formed and subsequently joined.

Figure 8:
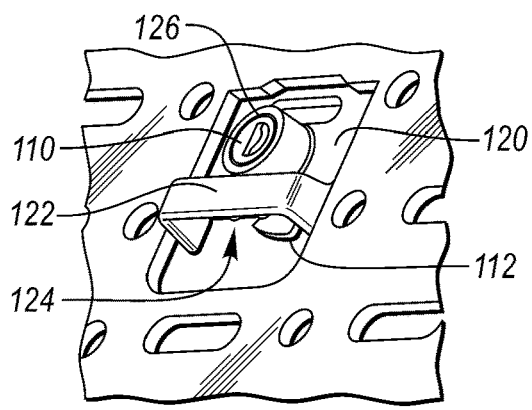
FIG. 8 is a front perspective view of the attachment member.

Referring to FIG. 8, the attachment member 74 may further include an interface portion 120. The interface portion 120 may be a discrete interface body, and may be formed of a different material than the T-mount 100; for example, plastic. The interface portion 120 may form an interference fit (e.g., snap-fit or press-fit) interface with the T-mount 100. The interface portion 120 may be secured to the T-mount 100 such that it extends across the mounting aperture 84.

The interface portion 120 may define a protruding handle 122. The handle 122 may be disposed within the mounting aperture 84 such that it extends through the mounting aperture 84 and beyond a front face 72b of the plate member 72. The handle 122 may define a recess 124. The recess 124 may be dimensioned so as to provide sufficient clearance for a user to place fingers under the handle 122. More particularly, the recess 124 may be dimensioned so as to provide sufficient clearance for a user to place fingers between the handle 122 and a surface behind the mounting assembly 70 (e.g., the anchor plate 50) when the mounting assembly 70 is being installed or uninstalled.

The attachment member 74 and the opening 56 of the anchor plate 50 may be dimensioned such that the head 104 of the T-mount 100 can be received within the insertion portion 58 and the neck 102 can be received within the locking portion 60. In at least one approach, the head 104 may be wider than the locking portion 60, thereby inhibiting the T-mount 100 from being removed from the anchor plate 50 when the neck 102 is disposed within the locking portion 60. In this way, the mounting assembly 70 may be installed into the anchor plate 50 by inserting the T-mount 100 into the insertion portion 58, and subsequently sliding the mounting assembly 70 upward to place the T-mount 100 within the locking portion 60.

The attachment member 74 may further include a lock assembly including a lock cylinder 110 and a lock arm 112. The lock cylinder 110 may be disposed, for example, on or adjacent the T-mount 100. A lock arm 112 may be rotated by the lock cylinder 110 between the locked position and an unlocked position (in which the lock arm 112 may be rotated 90°, for example). The lock arm 112 may be rotated behind a bottom edge of the insertion portion 58 to lock the attachment member 74 within the opening 56. A key may be used to lock and unlock the lock cylinder 110. The lock cylinder 110 may include a "learning lock" adapted to learn a key interface.

The interface portion 120 may further define a hollow cylinder 126 that may be adapted to receive the lock cylinder 110 and permit rotation of the lock cylinder 110 therein.

Figure 9:
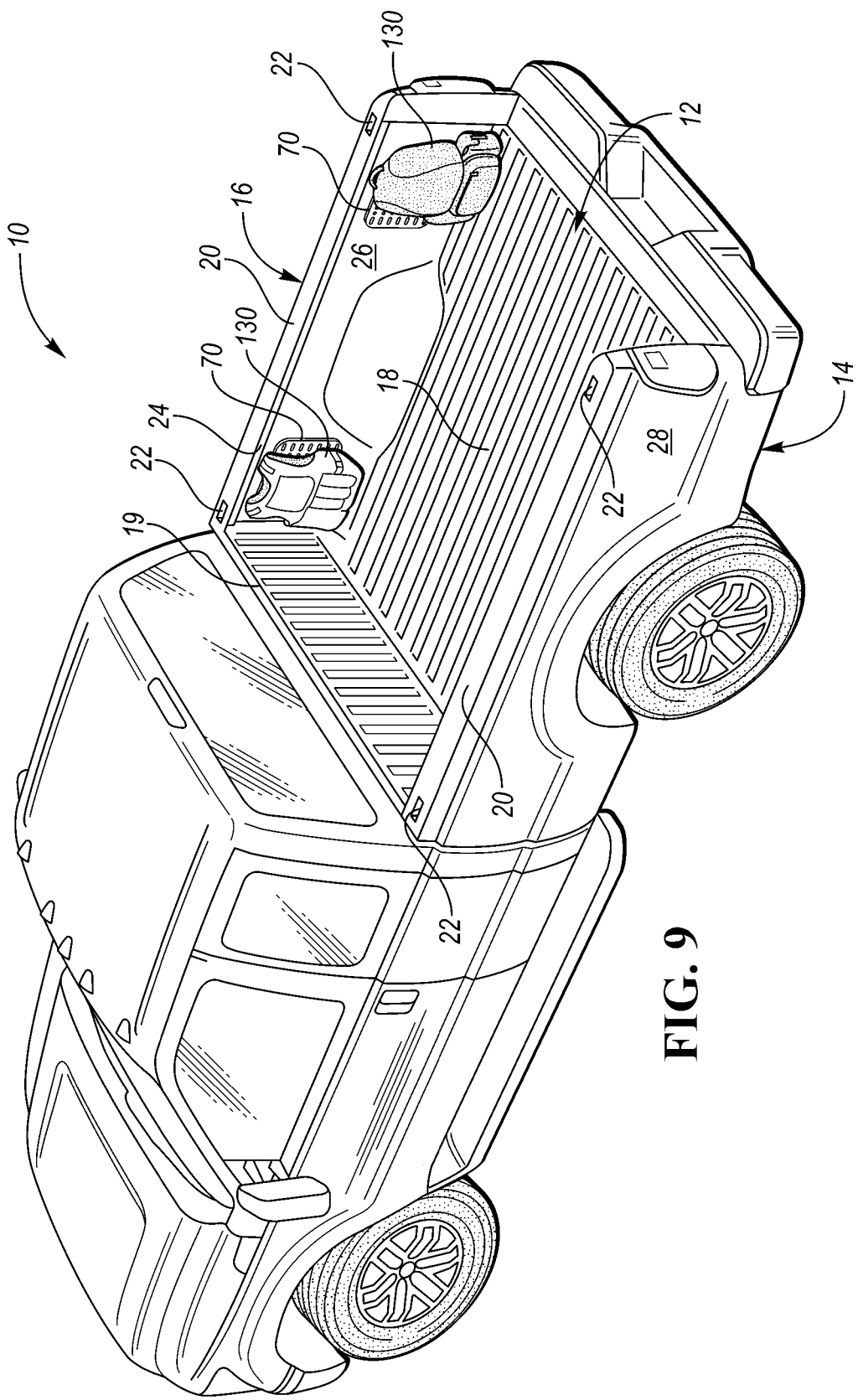
FIG. 9 is a perspective view of a vehicle having cargo attached to the mounting assembly.

Referring now to FIG. 9, a user may secure one or more items 130 to the plate member 72 of the mounting assembly 70 when the mounting assembly 70 is installed at an anchor 30 at an internal side surface 26 of a sidewall (e.g., sidewall 14, 16) of a vehicle 10. In at least one approach, an item 130 may be supported by the truck bed floor 18, and lateral movement of the item 130 within the truck bed 12 may be substantially inhibited due at least in part to the securement of the item 130 to the mounting assembly 70. In at least another approach, an item 130 may be supported by the mounting assembly 70, and may be spaced above the truck bed floor 18 such that the item does not contact the truck bed floor 18.

The mounting assembly 70 may be installed at the anchors 30 with items 130 already secured to the plate member 72. Similarly, the mounting assembly 70 may be uninstalled from the anchors 30 with items 130 still secured to the plate member 72. A single mounting assembly 70 may be adapted to receive multiple discrete items at the same time. As such, the mounting assembly 70 may be installed and/or uninstalled from the anchors 30 with multiple items 130 secured to the plate member 72.

Figure 10:
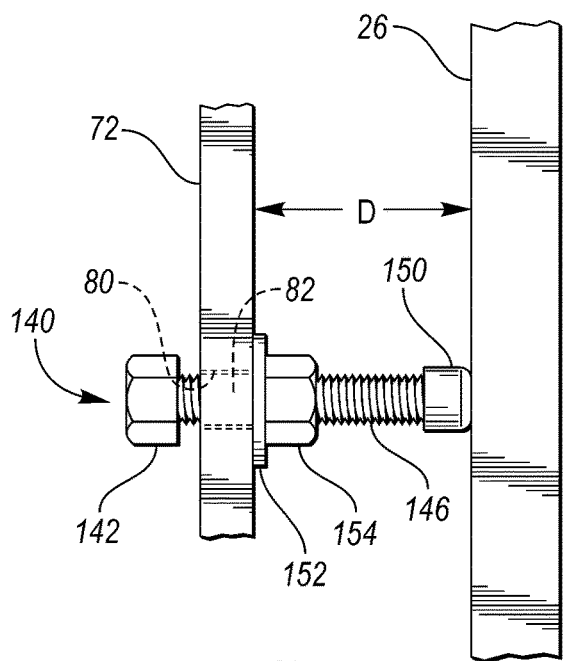
FIG. 10 is a side view of an example bolt assembly.
Figure 11:
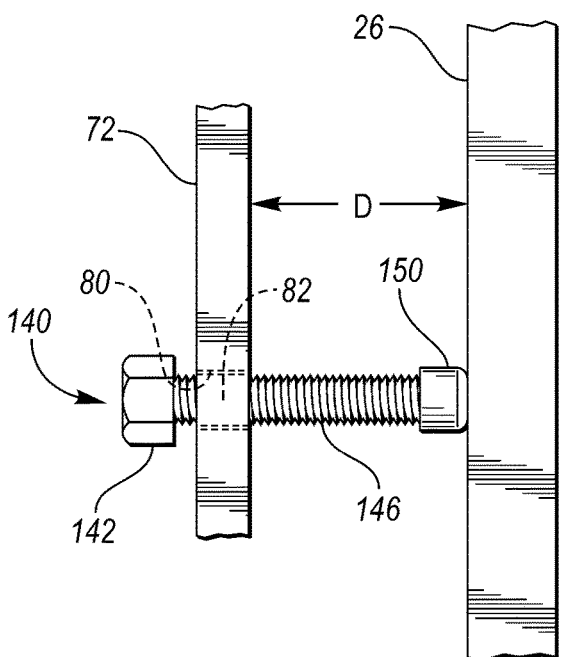
FIG. 11 is a side view of another example bolt assembly.
Figure 12:
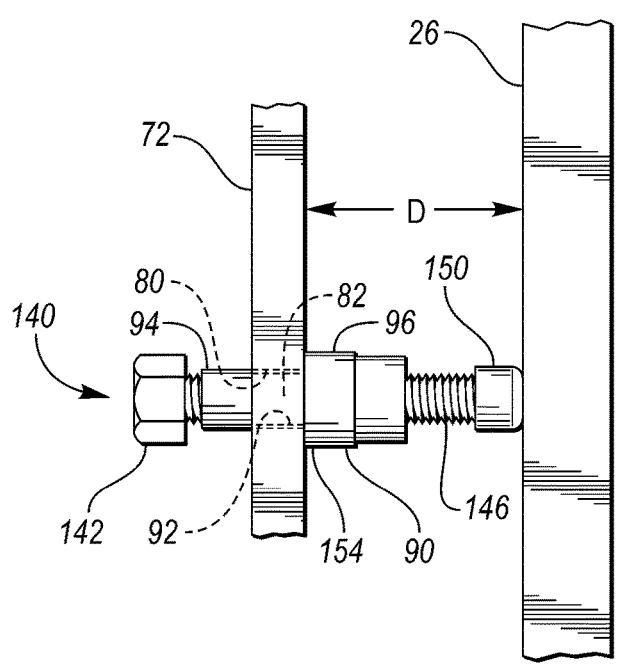
FIG. 12 is a side view of still another example bolt assembly.

Referring now to FIGS. 10-12, the mounting assembly 70 may be provided with additional support through the use of one or more spacer assemblies such as bolt assemblies 140. A bolt assembly 140 may include a bolt 142 having a bolt head 144 and a bolt shaft 146. The bolt shaft 146 may be a threaded bolt shaft having at least one protrusion defining a thread. The bolt shaft 146 may have an outer diameter less than a diameter of an aperture 82 such that the bolt shaft 146 may be received between aperture walls 80 of the plate member 72. The bolt shaft 146 may be received, for example, in aperture 82a, 82b, or another aperture disposed through the plate member 72.

An end region of the bolt shaft 146 may be adapted to receive a bolt cap 150. The bolt cap 150 may be formed of a different material than the bolt 142. The bolt cap may be an elastomeric tip formed, for example, of santoprene, ethylene propylene diene monomer rubber (EPDM), or silicone. One or more spacers or washers 152 may also be provided.

Through at least the bolt 142 and the bolt cap 150, the bolt assembly 140 may be adapted to space at least a portion of the plate member 72 of the mounting assembly 70 a distance D away from an internal side surface 26 of a sidewall (e.g., sidewall 14, 16) of a vehicle 10.

Referring to FIG. 10, the bolt shaft 146 may be inserted through an aperture 82 such that the bolt cap 150 engages the internal surface 26. A nut 154 may then be threaded onto the bolt shaft 146 until the nut 154 is compressed against the plate member 72 (e.g., through direct engagement or indirectly through a washer 152). The nut 154 may be threaded along the bolt shaft 146 (and thereby axially moving the plate member 72) until the plate member 72 is spaced a desired distance D from the internal surface 26.

Referring to FIG. 11, an aperture wall 80 may be a threaded aperture wall 80. The bolt 142 may be threaded through the threaded aperture wall 80 such that the bolt cap 150 engages the internal surface 26. The bolt shaft 146 may continue to be threaded through the threaded aperture wall 80 until the plate member 72 is spaced a desired distance D from the internal surface 26.

Referring to FIG. 12, an insert 90 may be disposed in an aperture 82. The insert 90 may have an inner aperture 92 (which may be referred to as an insert aperture) disposed therethrough. The insert 90 may receive a bolt shaft 146 through the inner aperture 92. In this way, the inner aperture 92 may be a self-threading inner aperture 92. The bolt 142 may be threaded through the inner aperture 92 of the insert 90 such that the bolt cap 150 engages the internal surface 26. The bolt 142 may continue to be threaded through the inner aperture 92 of the insert 90 until the plate member 72 is spaced a desired distance D from the internal surface 26. In an optional approach, a nut 154 may be threaded along the bolt shaft 146 until the plate member 72 is spaced the desired distance D from the internal surface 26.

In at least one approach, two bolt assemblies 140 may be provided at lower corners of the plate member 72. In at least another approach, four bolt assemblies 140 may be installed in the region of lower and upper corners of the plate member 72. In this way, the plate member may be provided with additional support and stability. More particularly, rotation of the plate member 72 (for example, about attachment member 74) may be reduced or inhibited due to the bolt assemblies 140 maintaining the plate member 72 a desired distance D from the internal surface 26.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
  a pickup-truck box including a bed and opposing sidewalls extending vertically from the bed;
  an anchor plate supported on at least one sidewall and defining an opening through the anchor plate, the anchor plate and the at least one side sidewall further defining a cavity between the anchor plate and the at least one sidewall; and
  a mounting assembly removably secured to the anchor plate and including
  a planar plate extending substantially parallel to the at least one sidewall and defining an array of apertures including at least one column of elongated apertures and a mounting aperture, and
  an attachment member disposed in engagement with the anchor plate, the attachment member including a T-mount having
  a neck region extending substantially perpendicularly from a back surface of the planar plate proximate the mounting aperture and through the opening,
  a head region disposed at least partially in the cavity, the head region including at least one flange extending from the neck region parallel to the planar plate, and
  the attachment member further having a discrete interface body formed of a different material than the T-mount secured to the T-mount and extending across the mounting aperture, the interface body defining a handle disposed within the mounting aperture and extending beyond a front face of the planar plate, the handle defining a recess.

2. The vehicle of claim 1 further comprising:
  a spacer assembly including
  a bolt having a shaft defining at least one thread disposed along at least a portion of the shaft, and
  an elastomeric tip disposed at an end of the shaft and in engagement with the at least one sidewall.

3. The vehicle of claim 2 wherein the shaft is disposed through an aperture of the array of apertures, and wherein the elastomeric tip is disposed in engagement with the at least one sidewall.

4. The vehicle of claim 1 further comprising at least one elastomeric insert disposed at least partially through an aperture of the array of apertures, and wherein the elastomeric insert is disposed in engagement with the at least one sidewall.

5. The vehicle of claim 1 wherein the column of elongated apertures includes a first column of elongated apertures and a second column of elongated apertures, and wherein the array of apertures further includes a column of circular apertures disposed between the first and second columns of elongated apertures.

6. The vehicle of claim 5 wherein the column of elongated apertures includes at least four columns of elongated apertures and at least three columns of circular apertures disposed in alternating arrangement with the at least four columns of elongated apertures along the planar plate.

7. The vehicle of claim 5 wherein the first and second columns of elongated apertures each include at least three elongated apertures, and Wherein the column of circular apertures includes at least three elongated apertures.

8. The vehicle of claim 5 wherein the column of circular apertures includes the same number of circular apertures as elongated apertures of the first and second columns of elongated apertures.

9. The vehicle of claim 5 wherein circular apertures of the column of circular apertures are vertically aligned with elongated apertures of the first and second columns of elongated apertures.

10. The vehicle of claim 1 wherein the T-mount is a unitary, integrally-formed T-mount fixedly secured to the back surface of the planar plate.

11. The vehicle of claim 1 wherein the interface body defines a hollow cylinder disposed within the mounting aperture and extending beyond a front face of the planar plate, and wherein the mounting assembly further includes a lock cylinder and a lock arm rotatable into and out of engagement with the anchor plate.

12. A mounting assembly for a sidewall of a truck bed comprising:
  a planar plate removably securable to the sidewall and defining an array of apertures including alternating columns of elongated aperture columns, a mounting aperture, and circular aperture columns;
  an attachment member disposed in engagement with the anchor plate and including a mount, the attachment member having a discrete interface body formed of a different material than the mount and secured to the mount and extending across the mounting aperture the interface body defining a handle disposed within the mounting aperture and extending beyond a front face of the planar plate, the handle defining a recess; and
  at least one elastomeric insert extending at least partially within an aperture of the array of apertures and beyond a back surface of the planar plate for engaging the sidewall.

13. The mounting, assembly of claim 12 wherein the elastomeric insert is a circular elastomeric insert disposed at least partially through a circular aperture of the circular aperture columns.

14. The mourning assembly of claim 12 wherein the elastomeric insert is an elongated elastomeric insert disposed at least partially through an elongated aperture of the elongated aperture columns.

15. The mounting assembly of claim 12 wherein the elastomeric insert includes a neck portion having a first outer diameter, and a head portion having a second outer diameter larger than the first outer diameter.

16. The mounting assembly of claim 12 wherein the elastomeric insert defines an insert aperture disposed through the elastomeric insert.

17. The mounting assembly of claim 16 wherein the mounting assembly further includes a spacer assembly including a threaded bolt disposed within the insert aperture, and an elastomeric tip disposed at an end of the threaded bolt for engaging the sidewall.

18. A vehicle comprising:
- a pickup-truck box including a bed and opposing sidewalls extending vertically from the bed;
- an anchor plate supported on at least one sidewall and defining an opening through the anchor plate, the anchor plate and the at least one side sidewall further defining a cavity between the anchor plate and the at least one sidewall; and
- a mounting assembly removably secured to the anchor plate and including
- a planar plate extending substantially parallel to the at least one sidewall and defining an array of apertures including at least one column of elongated apertures and a mounting aperture, and
- an attachment member disposed in engagement with the anchor plate, the attachment member including a T-mount having
- a neck region extending substantially perpendicularly from a back surface of the planar plate proximate the mounting aperture and through the opening,
- a head region disposed at least partially in the cavity, the head region including at least one flange extending from the neck region parallel to the planar plate, and
- the attachment member further having a discrete interface body formed of a different material than the T-mount secured to the T-mount and extending across the mounting aperture, the interface body defining a hollow cylinder disposed within the mounting aperture and extending beyond a front face of the planar plate, and wherein the mounting assembly further includes a lock cylinder and a lock arm rotatable into and out of engagement with the anchor plate.

* * * * *